United States Patent [19]

Mercer et al.

[11] Patent Number: 5,259,956
[45] Date of Patent: Nov. 9, 1993

[54] TUBE LIQUID DISPENSER

[75] Inventors: Howard A. Mercer, Fayetteville; Michael W. Smith, Fairburn, both of Ga.

[73] Assignee: Porex Technologies Corp., Fairburn, Ga.

[21] Appl. No.: 892,025

[22] Filed: Jun. 2, 1992

[51] Int. Cl.⁵ .............................................. B01D 35/00
[52] U.S. Cl. ..................... 210/454; 210/453; 222/189; 222/206; 222/420; 422/100; 422/101; 422/102
[58] Field of Search ............... 210/451, 453, 454; 422/100, 101, 102; 222/189, 206, 215, 420

[56] References Cited

U.S. PATENT DOCUMENTS 3,846,077 11/1974 Ohringeer .
3,955,423 5/1976 Ohringer .
4,483,825 11/1984 Fatches ............................. 422/100
5,139,174 8/1992 Golias ............................... 222/189

OTHER PUBLICATIONS

Helena Laboratories TipTop advertisement; Mar. 1987.
Helena laboratories TipTop advertisement; Jan. 1988.

Primary Examiner—Robert A. Dawson
Assistant Examiner—Sun Uk Kim
Attorney, Agent, or Firm—Lane, Aiken & McCann

[57] ABSTRACT

A tube liquid dispenser includes a resilient tube, a filter positioned in the tube at one end, a flange of sealing material extending radially around the outer circumference of the tube, and an opposite end closed except for a dispensing opening of a size through which liquid passes only upon the application of pressure to the liquid.

14 Claims, 4 Drawing Sheets

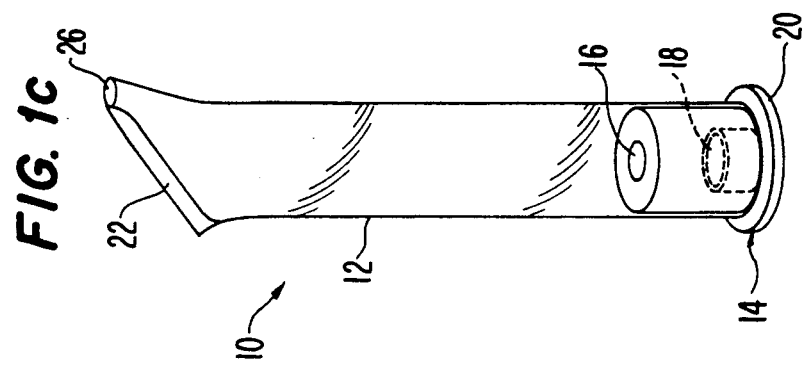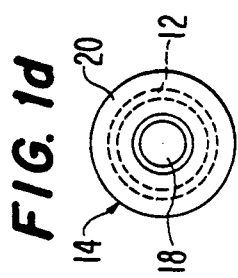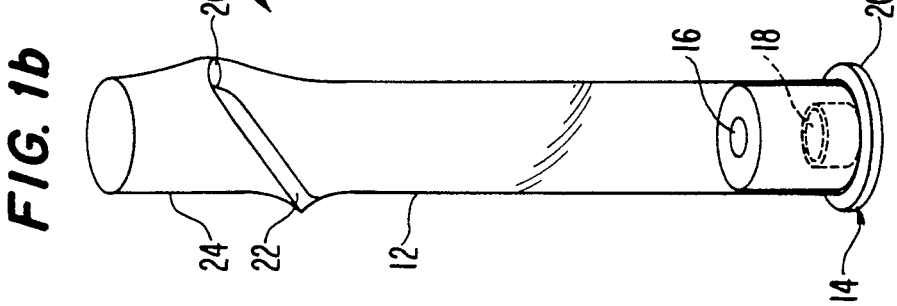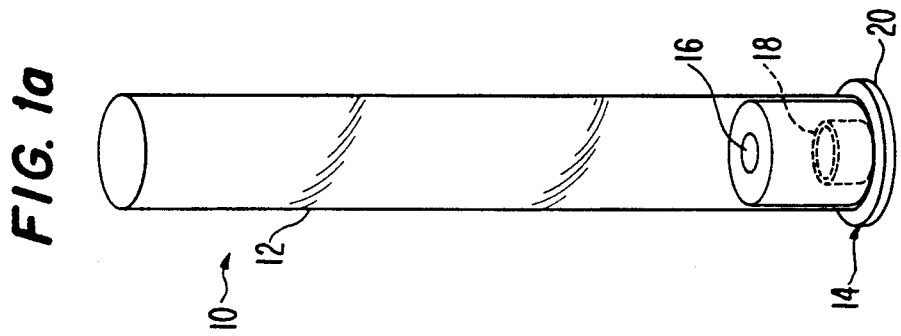

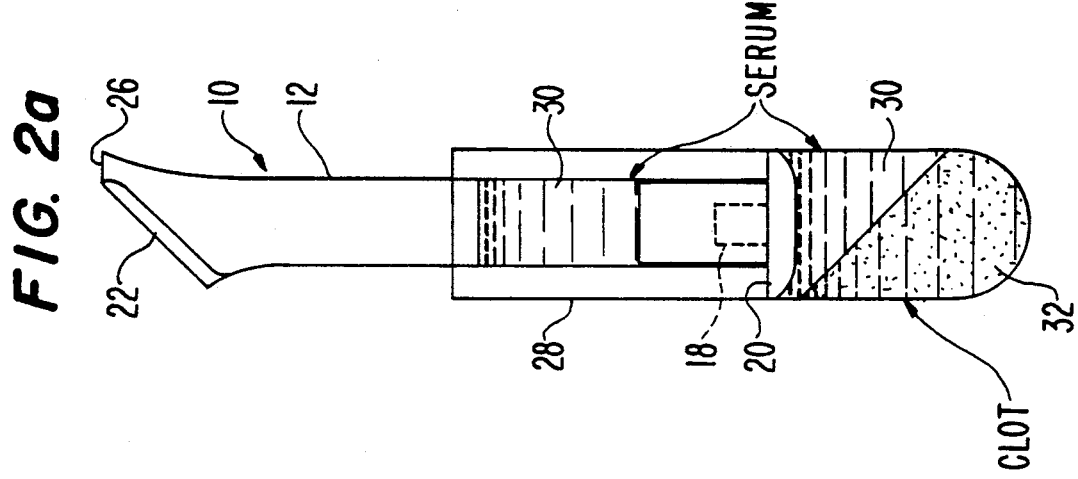
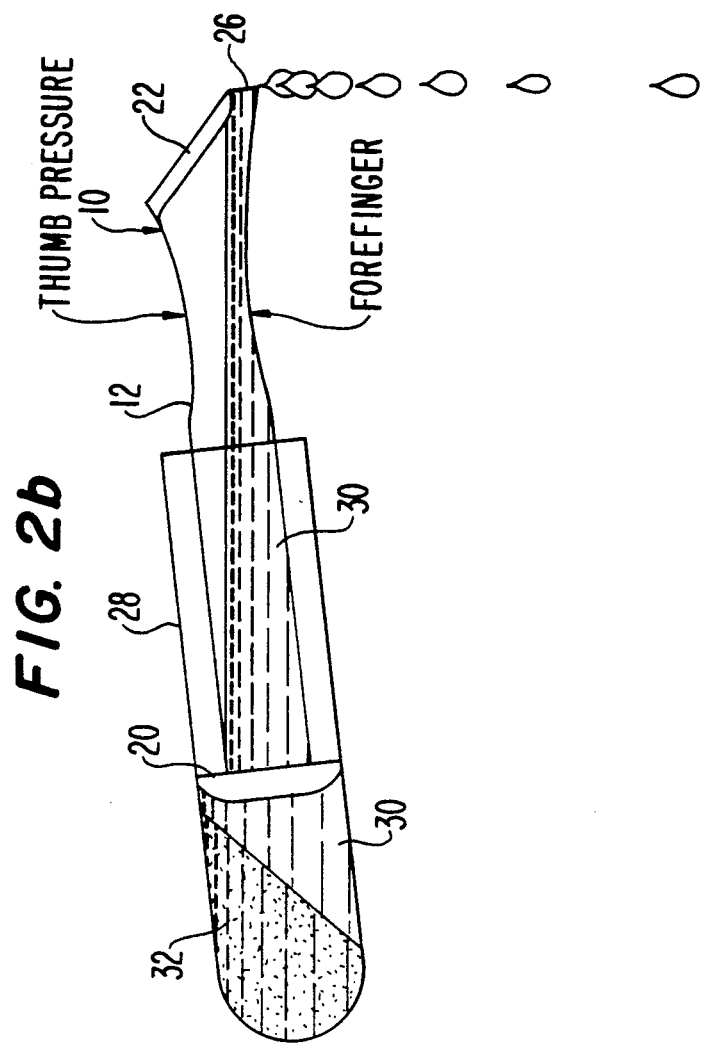

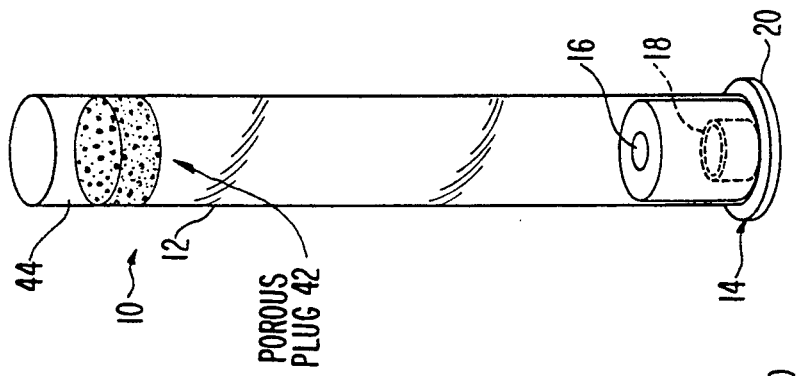
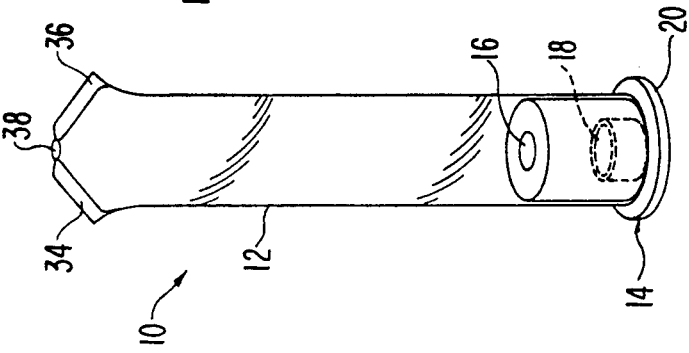
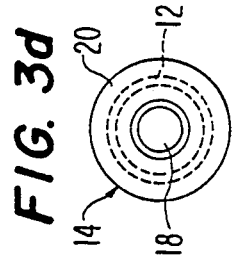
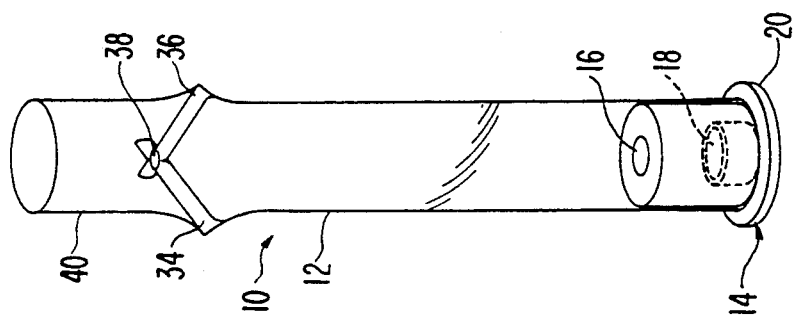
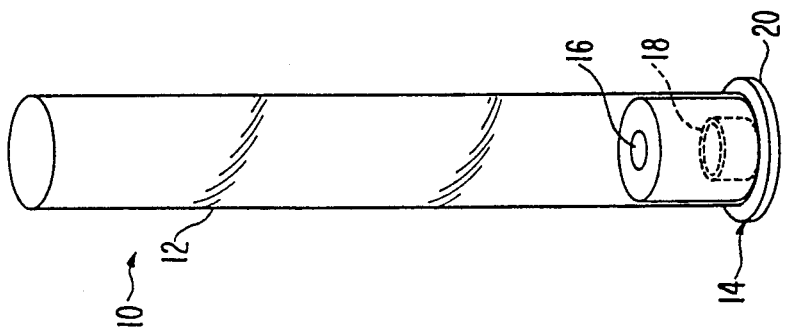

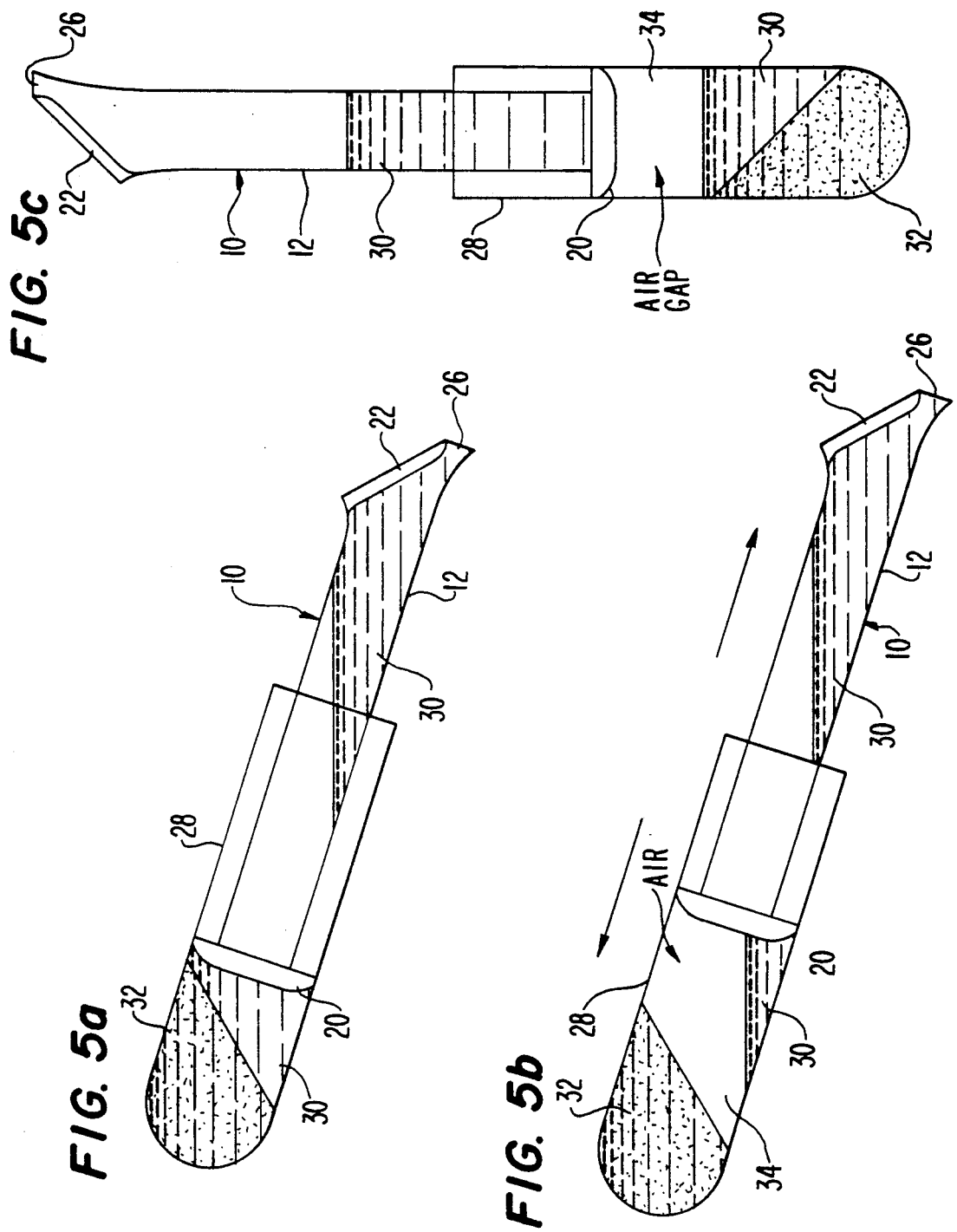

TUBE LIQUID DISPENSER

BACKGROUND OF THE INVENTION

The present invention relates to a device for controlled dispensing of liquid and, more particularly, a blood serum filter dispenser having an arrangement for storing and dispensing the filtered serum with the minimum possibility of contamination.

Because of the infectious diseases, including the HIV virus, that can be transferred via blood serum, medical laboratory personnel are greatly concerned about the possibility of contamination. The ordinary procedure used in clinical laboratories in the testing of blood are: (1) a capped collection tube containing blood is centrifuged to cause the red cells to separate from the serum and settle into the bottom of the tube; (2) the cap is removed from the tube, and a smaller, filter tube having a filter covering the leading end is pushed in the manner of a piston down the collection tube, forcing the serum in the collection tube through the filter into the filter tube; and (3) either the serum is poured out of the filter tube into small cups or other tubes for testing, or a pipet is inserted into the filter tube and serum is withdrawn and then dispensed into the small cups or other tubes.

There are a number of opportunities for contamination to occur during the foregoing procedure: (1) When the filter tube is pushed down into the serum in the collection tube, serum is forced through the pores of the filter at a high velocity. This provides the possibility, at the moment that the serum first emerges from the filter, for aerosoling, that is, the formation and expulsion into the air of small droplets of serum. These droplets can fly up into the face of laboratory personnel as a contaminate. (2) The serum left in the smaller tube is subject to spilling if the tube is accidentally tipped over. (3) The dispensing pipet is one more contaminated item that must be discarded after each test. (4) Serum poured from the filter tube is subject to spilling and uncontrolled dispensing. (5) Pipets might drip when moved from the smaller tube to the small cups or other tubes. (6) Serum must be capped or covered during storage. The cap or cover is another item that becomes contaminated and must be disposed of.

It is sometimes convenient to store the serum with the red blood cell clot in the tube after centrifuging. A problem with this is that some chemistry values will change (for example, glucose and potassium values will increase) and incorrect analysis will result. In order to prevent this, sometimes the serum is poured off and sometimes a mechanical barrier is placed between the clot and the serum.

SUMMARY OF THE INVENTION

By the present invention, blood serum can be filtered and dispensed in a controlled manner into small cups or other tubes for testing with minimal risk of contamination to laboratory personnel.

In order to achieve these advantages, the blood serum filter dispenser according to the present invention comprises a filter tube sized to fit within a tube containing blood serum, wherein the filter tube has a filter at its leading end in the blood serum tube, a seal for sealing with the interior surface of the blood serum tube, and an opposite end substantially closed except for an opening sized to prevent unintentional passage of serum. If any aerosoling occurs, the aerosol droplets will, for the most part, impinge on the side walls of the tube and remain there, because of the small dispensing opening and the shape of the walls. Also because of the small size of the dispensing opening, liquid cannot run freely from the tube and, therefore, cannot be spilled if the tube is accidentally tipped over. Again because of the smallness of the opening, evaporation is minimized, so that no cap is required. The tube is squeezeable to permit the serum to be forced through the dispensing opening in a controlled manner. Accordingly, no dispensing pipet is required for precise dispensing of fluid into a small cup or other tube for testing.

In addition, the blood serum filter dispenser according to the present invention serves as a mechanism for conveniently storing serum while preventing changes in chemistry values, without pouring the serum off and without inserting a mechanical barrier. In order to provide such storage, the filter tube is pushed into the serum in the collection tube to force the serum through the filter. However, the filter has not proven to be a reliable barrier between the serum and the clot, and so, if the sample is just stored in this condition, chemistry values might change. Instead, the filter dispenser is inverted, and the filter tube is pulled partially out of the blood collection tube. This causes air to be drawn into the filter dispenser through the dispensing opening and the serum in the filter tube, and then through the filter to form an ion barrier in the space between the filter and the clot in the collection tube. When the filter dispenser is turned upright, the filter tube remains in its partially pulled out position, the serum remains above the filter, and the ion barrier remains between the filter and the clot. As a result, serum can be stored right in the filter dispenser for up to about seven days by capping or otherwise covering the filter dispenser and storing it in a refrigerator.

The device according to the present invention can be used to filter and dispense liquids other than blood serum, especially in connection with chemistry and biological laboratory procedures. Furthermore, the device can function as a dispenser without the filter, thereby making the device applicable to an even wider variety of uses.

BRIEF DESCRIPTION OF THE DRAWINGS

FIG. 1a is a front perspective view of a first embodiment of a known blood filter tube, which is also a stage in the manufacture of the blood serum filter dispenser according to the present invention;

FIG. 1b is another stage in the manufacture of the first embodiment of the blood serum filter dispenser according to the present invention, which is also the final form of a second embodiment of the blood serum filter according to the present invention;

FIG. 1c is a front perspective view of the completed blood serum filter dispenser of the first embodiment according to the present invention;

FIG. 1d is a bottom plan view of the blood serum filter dispenser of FIG. 1c;

FIG. 2a is a front elevation of the blood serum filter dispenser of FIG. 1c in position in a blood collection tube containing blood which has been centrifuged;

FIG. 2b is a front elevation of the assembly of the blood collection tube and blood serum filter dispenser of FIG. 2a in a dispensing mode;

FIG. 3a is a front perspective view of a stage in the manufacture of a third embodiment of a blood serum filter dispenser according to the present invention;

FIG. 3b is another stage in the manufacture of the third embodiment according to the present invention;

FIG. 3c is the final form of the third embodiment of the blood serum filter dispenser according to the present invention;

FIG. 3d is a bottom plan view of the blood serum filter dispenser of FIG. 3c;

FIG. 4 is a front perspective view of a fourth embodiment of the blood serum filter dispenser according to the present invention;

FIG. 5a is a front elevation of the blood serum filter dispenser of FIG. 2a tipped to a position with the serum at the dispensing opening;

FIG. 5b is a view of the blood serum filter dispenser of FIG. 5a, with the filter tube pulled partially out of the collection tube relative to the position shown in FIG. 5a; and FIG. 5c is a view of the blood serum filter dispenser of FIG. 5b returned to an upright position.

DETAILED DESCRIPTION OF THE PREFERRED EMBODIMENTS

As can be seen from FIG. 1a, in a preliminary stage in the manufacture of a first embodiment of the blood serum filter dispenser according to the present invention, which is designated generally the reference numeral 10, the filter dispenser comprises a filter tube 12 which is open at one end and closed at an opposite end by a stopple member 14 having a central passage 16, a porous plastic plug filter 18 in the passage, and a flange 20 extending radially beyond the outer circumference of the filter tube 12. The filter tube 12 is made of clear thermoplastic and is resiliently deformable by squeezing against opposite sides. The stopple member 14 is made of an elastomeric material, and the flange 20 is adapted to form a seal with the inner surface of a collection tube slightly larger than the filter tube 12, so that the flange 20 acts as a piston in the larger tube, as can be appreciated from FIGS. 2a and 2b. Pushing the filter dispenser 10 into liquid in the larger tube causes liquid to flow through the central passage 16 and through the filter 18 positioned in the central passage. Although the structure illustrated in FIG. 1a is a preliminary stage in the filter dispenser 10 according to the present invention, it is the completed form of a known blood serum filter, and is available from Porex Technologies Corp. of Fairburn, Ga. under the trademark FILTER SAMPLER. Pushing the blood serum filter into a collection tube is a part of the ordinary procedure used in the testing of blood.

As can be seen from FIG. 1b, in a second stage of manufacture, the filter tube 12 of the blood serum filter dispenser 10 is almost entirely closed near the end opposite to the stopple member 14 by an ultrasonic or thermal weld 22 formed at an oblique angle. The weld is formed by pinching the resilient walls together along the oblique line of the weld 22, and then welding walls together along the oblique line. When the walls are pinched together along the oblique line, the upper end of which ends a little short of extending all the way across the tube, the tube wall beyond the upper end of the oblique line bulges out to form the dispensing opening.

As can be seen from FIG. 1c, the portion 24 of the filter tube 12 above the weld 22 is trimmed away to form a dispensing opening 26 through the small portion of the cross section of the filter tube 12 which is not welded closed, and thereby complete the filter tube 12.

Due to the oblique angle of the weld 22 and the position of the dispensing opening 26 adjacent to one side of the filter tube 12, the end of the tube adjacent to the dispensing opening tapers toward the dispensing opening. The dispensing opening 26 is sized so that the liquid contained in the filter tube 12 will not pass through the opening 26 when the filter tube 12 is in a horizontal orientation unless pressure is applied to the liquid. Fluid can be dispensed through the opening 26 in a controlled manner by squeezing on the sides of the filter tube 12. In the present embodiment, the dispensing opening 26 has a thin teardrop shape having a length of about 1.0–2.5 mm and a width of about one-half the length. The structure of the weld and the opening at the top of the tube lends itself to easy and inexpensive manufacture requiring only simple welding and trimming steps to an existing product.

In use, the filter dispenser 10 is inserted into a collection tube 28 containing blood in which serum 30 has been separated from red cells 32, such as by centrifuging. The flange 20 forms a seal with the inner surface of the collection tube 28, and, as the filter dispenser 10 moves into the serum, the serum 30 passes through the filter 18 and the passage 16 and into the filter tube 12. If any aerosoling of the serum occurs, the droplets will, for the most part, impinge on the walls of the filter tube 12 and remain there due to the small size of the dispensing opening 26 and the shape of the walls. Due to the small size of the dispensing opening 26, liquid will not run from the filter tube 12 and, therefore, cannot be spilled if the filter dispenser 10 is accidentally tipped over.

As can be appreciated from FIG. 2*b,* when it is desired to dispense liquid from the filter dispenser 10 in a controlled manner, the filter dispenser 10 and the collection tube 28 are tipped together as an assembly, with the dispensing opening 26 at the bottom side of the assembly. This can be done with one hand by engaging the underside of the filter dispenser 10 with the forefinger and the topside of the filter dispenser with the thumb. The flange 20 prevents liquid from flowing out of the collection tube 28, while squeezing on the sides of the filter dispenser 10 causes droplets of the serum to pass through the dispensing opening 26 in a controlled manner. The greater the pressure of the squeezing on the filter dispenser 10, the faster the rate of dispensing. When the squeezing force is relieved, dispensing stops, even though there is liquid in the filter dispenser 10 at the dispensing opening 26. The portion of the collection tube 28 below the flange 20 is full of liquid. As a result, squeezing the sides of the filter dispenser 10 does not force air or serum back through the filter 18.

In a second embodiment of the filter dispenser according to the present invention, the step of trimming excess material above the weld 22 is eliminated, and the form of the filter dispenser 10 shown in FIG. 1*b* is the completed filter dispenser. In this form, the portion of the tube 12 above the weld 22 forms a reservoir that can be used to hold a small amount of fluid, so that a precision pipet, a swab or other device can be used for specific tests requiring extraction by this method.

In a third embodiment of the filter dispenser according to the present invention, as can be seen from FIGS. 3*a*–3*c,* an intermediate form of the filter dispenser 10, as shown in FIG. 3*a,* is the same as that shown in FIG. 1*a,* and, thus, is the same as the commercially available FILTER SAMPLER® blood serum filter. However, as can be seen from FIG. 3*b,* in a later stage in the manufacture of the third embodiment, a first weld 34 is formed across the filter tube 12, at an oblique angle, to a point slightly less than halfway across the filter tube. Another weld 36 is formed from the opposite side of the filter tube 12, at the same oblique angle, to a point just short of halfway across the filter tube. The results are that a small dispensing opening 38 having substantially the same size as the dispensing opening 26 of the embodiment of FIG. 1c is formed at the center of the filter tube 12 and that a new tube end is formed which tapers toward the dispensing opening. As can be seen from FIG. 3c, the portion 40 of the filter tube 12 above the welds 34 and 36 is trimmed away to expose the dispensing opening 38. As with the dispensing opening 26 of the embodiment of FIG. 1c, the dispensing opening 38 is sized so that the fluid in the filter dispenser 10 will not pass through the dispensing opening unless the filter dispenser is squeezed, or pressure is otherwise applied to the fluid in the filter dispenser. This feature is common to all of the aforesaid embodiments of the filter dispenser according to the present invention. Furthermore, it is apparent that other configurations of the filter dispenser 10 having a dispensing outlet which functions in the same manner are possible. It is also apparent that other methods for forming the embodiments described herein, as well as other embodiments, can be used.

In another embodiment of the filter dispenser according to the present invention, as can be seen from FIG. 4, no welds or other closing of the wall of the filter tube 12 is present. Instead, a plug 42 of porous material is secured in the filter tube 12 adjacent the open upper end of the filter tube. In all other respects, the filter dispenser 10 of FIG. 4 is the same as the filter dispenser 10 of FIG. 1c. In the embodiment of FIG. 4, the plug 42 of porous material prevents droplets of serum from flying up into the face of personnel when the serum is first forced through the filter 18. The plug 42 also prevents fluid in the filter dispenser 10 from passing out of the filter dispenser unless the sides of the filter dispenser are squeezed. Because of surface tension and the fact that air cannot flow back into the filter dispenser 10 to allow fluid to flow out, fluid can only be dispensed by squeezing the side walls of the filter tube 12. The material of the porous plug is the same as the material of the filter 18 described herein and the same as the filter material used in the commercially available FILTER SAMPLER ® blood serum filter.

The plug 42 of porous material is spaced slightly below the open end of the filter dispenser 10 to define a reservoir 44 for holding serum which has been forced past the plug. Thus, as with the embodiment of FIG. 1b, a precision pipet, a swab, or other device can be used to remove serum from the reservoir 44. The embodiment of FIG. 4 can also be used in a non-reservoir mode, in which the filter dispenser 10 is tipped, and the serum forced past the plug 42 flows out of the open end of the filter dispenser 10 into a small cup or other tube for testing.

The blood serum filter dispenser according to the present invention can serve as a mechanism for conveniently storing serum while preventing changes in chemistry values, without pouring the serum off and without inserting a mechanical barrier. In order to provide such storage, the filter tube 12 is pushed into the serum in the collection tube 28 to force the serum through the filter 18, as can be appreciated from FIG. 2a. However, the filter 18 has not proven to be a reliable barrier between the serum and the clot, and so, if the sample is just stored in this condition, chemistry values might change. Instead, as can be seen in FIG. 5a, the filter dispenser 10 and the blood collection tube 28 are inverted until gravity urges the serum in the blood collection tube away from the filter 18. Then, the filter tube 12 is pulled partially out of the blood collection tube 28 as shown in FIG. 5b. This causes air to be drawn into the filter dispenser 10 through the dispensing opening 26 and the serum 30 in the filter tube 12, and then through the filter 18 to form an ion barrier 34 in the space between the filter and the clot 32 in the collection tube 28. When the filter dispenser 10 is turned upright, as shown in FIG. 5c, the filter tube 12 remains in its partially pulled out position, the serum 30 remains above the filter, and the ion barrier 34 remains between the filter 18 and the clot 32. As a result, serum can be stored right in the filter dispenser 10 for up to about seven days by capping or otherwise covering the filter dispenser and storing it in a refrigerator.

Although the apparatus according to the present invention has been described as a blood serum filter dispenser 10, the apparatus is also suitable for filtering and dispensing other liquids, especially in applications involving chemistry and biological laboratory procedures. Furthermore, even without a filter, the apparatus is useful as a dispenser to dispense various liquids. The filter 18 can conveniently be omitted from the stopple member 14 for this purpose.

It will be apparent to those skilled in the art and it is contemplated that variations and/or changes in the embodiments illustrated and described herein may be made without departure from the present invention. For example, although the sealing flange 18 is a part of the stopple member 14 in the embodiment of the invention described and illustrated herein, the flange can take other forms, such as a flange molded as an integral part of the filter tube 12, the flange extending radially therefrom. As another example, the filter tube 12 can be injection molded with a dispensing opening in a closed end, rather than by welding closed one end of a tube which is initially formed open. Accordingly, it is intended that the foregoing description is illustrative only, not limiting, and that the true spirit and scope of the present invention will be determined by the appended claims.

We claim:

1. A tube liquid dispenser comprising:
    a resilient tube deformable by squeezing, said tube having a tube wall, first and second opposite ends, and an outer circumference;
    a flange of sealing material extending radially around the outer circumference of the tube; and
    a dispensing opening being provided at said second end by pinching the resilient wall of said tube together along a line extending transverse to the axis of said tube part way across said tube, leaving said dispensing opening beyond one end of said line, said wall being sealed together along said line.

2. The filter dispenser as recited in claim 1, wherein said line extends obliquely relative to the axis of said tube with said opening formed beyond the upper end of said line.

3. The liquid dispenser of claim 1, wherein said wall is sealed together along said line by a weld.

4. The liquid dispenser of claim 1, further comprising:
    a filter positioned in said tube at said first end of said tube; and means defining a reservoir positioned on an opposite side of said dispensing opening from said filter.

5. The liquid dispenser of claim 1, further comprising a filter positioned in said tube.

6. The liquid dispenser of claim 5, wherein said filter is positioned at said first end of said tube.

7. The liquid dispenser of claim 1, wherein said dispensing opening is of a size through which liquid will not flow without the application of pressure to the liquid.

8. The liquid dispenser of claim 7, wherein the dispensing opening has a length of about 1.0-2.5 mm and a width of about one-half the length.

9. The liquid dispenser of claim 1, wherein said dispensing opening is defined between the end of said line and a curved section of said wall of said tube.

10. The liquid dispenser of claim 9, wherein said second end tapers toward said dispensing opening.

11. The liquid dispenser of claim 1, wherein said dispensing opening is positioned on the axis of said tube.

12. The liquid dispenser of claim 11, wherein said second end comprises a first weld extending from a first point on said tube wall to said dispensing opening at an oblique angle relative to the axis of said tube, and a second weld extending from a second point on said tube wall to said dispensing opening at an oblique angle relative to the axis of said tube.

13. A tube liquid dispenser comprising:
a resilient tube deformable by squeezing, said tube having a tube wall, first and second opposite ends, and an outer circumference, said second end defining an opening large enough to permit the passage of liquid without the application of pressure to said liquid;
a flange of sealing material extending radially around the outer circumference of the tube; and
means for preventing passage of liquid through the opening defined by said second end without the application of pressure to said liquid and permitting controlled passage of the liquid through said second end in response to the application of pressure to the liquid wherein said preventing and permitting means comprises a plug of porous material positioned in said tube closing the second end of said tube.

14. Apparatus for handling blood, comprising:
a collection tube; and
a blood serum filter dispenser positioned in said collection tube, said blood serum filter dispenser including:
a resilient tube deformable by squeezing, said resilient tube having a tube wall, first and second opposite ends, and an outer circumference;
a filter positioned in said resilient tube;
a flange of sealing material extending radially around the outer circumference of the resilient tube and in sealing engagement with said collection tube; and
a dispensing opening being provided at said second end by pinching the resilient wall of said tube together along a line extending transverse to the axis of said tube part way across said tube, leaving said dispensing opening beyond one end of said line, said wall being sealed together along said line.

* * * * *